Oct. 24, 1939.  A. H. TINNERMAN  2,177,231
TOOL
Filed March 7, 1938
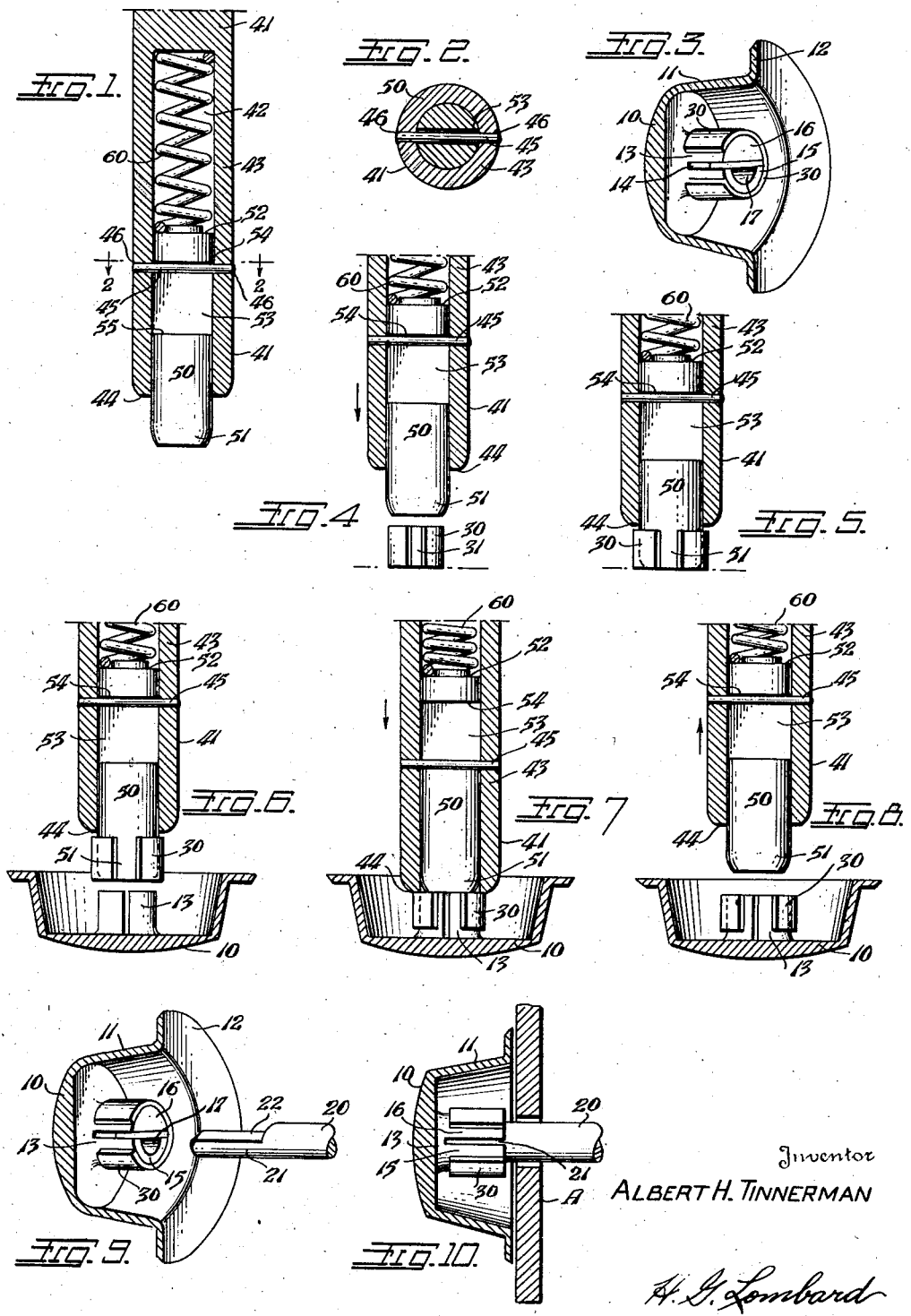
Inventor
ALBERT H. TINNERMAN
H. G. Lombard
Attorney Patented Oct. 24, 1939

2,177,231

UNITED STATES PATENT OFFICE 2,177,231

TOOL

Albert H. Tinnerman, Cleveland, Ohio

Application March 7, 1938, Serial No. 194,489

1 Claim. (Cl. 29—88.2)

This invention deals with a tool for applying a split ring or spring collar device serving as the binding or retaining element for a connecting hub in a joint comprising cooperating, complementary or interfitting parts.

More particularly, the present invention relates to an improved construction of a tool for applying a spring retaining collar, clamping ring or similar securing device in a connection comprising a connecting hub provided on a part receiving a shaft, rod, spindle or the like.

A most practical construction in which such a connecting hub and spring retaining collar is effectively employed as the connecting means embodies an arrangement for connecting a plastic knob or like part to a shaft or spindle having use, for example, as the adjusting element in a control unit of a radio apparatus. It is well known that certain plastic materials from which such knobs are formed are substantially semi-plastic in composition and, as such, have the inherent property known in the trade as "cold-flow" which has made it most difficult and, in many instances, prohibitive to provide an effective, satisfactory and inexpensive connecting means. This may be understood when it is considered that the usual form of retaining means for such connections embody spring, friction and clutch devices exerting a binding or wedging action between the shaft and inner side walls of the socket opening in the plastic hub; and in this relation the semi-plastic material of the hub is caused to yield and spread in and around the retaining means such that a truly tight, positive and rigid connection with the shaft is impossible and looseness and play in the connection is inevitable.

It has been found that a most satisfactory retaining means for such connections is inexpensively and effectively provided in the use of a spring retaining collar embracing the plastic hub under a clamping or compressive force to urge the plastic material of the side walls thereof toward continuously effective, rigid, clamping action with the shaft stem, thereby minimizing any tendency toward "cold flow" and otherwise rigidly retaining the plastic part against rotative as well as axial movement in assembled relation on the shaft.

Naturally any such spring retaining collar must be capable of exerting a highly compressive action in a small area and accordingly, have been found to be most effective when constructed from spring steel in the form of a split ring or collar having a cross sectional area, in untensioned, normal condition, somewhat smaller than that of the connecting hub to which it is applied. Due to the smallness in size of the retaining collars and their extraordinary resistance toward ready expansion, much difficulty is encountered in the assembly thereof onto a connecting hub, and it has been found most convenient and highly practical to apply the same in a method comprising generally the expansion of the spring ring by a substantial mandrel to a size equal to or greater than the cross section of the connecting hub and thereafter applying the same to the connecting hub in such expanded condition, simultaneously removing the mandrel therefrom such that the expanding means is no longer effective and the spring collar is free to assume its initial, untensioned condition in binding clamping relation with the connecting hub or the hub sections embraced thereby.

In practicing this method, the present invention contemplates the provision of a tool which may be employed either as a hand setting implement, or provided in multiple as tool heads in the turret of a machine designed for automatically applying the spring rings to their respective connecting hubs in the quantity production of such parts. In either embodiment, the tool comprises generally an expanding pilot or mandrel designed for expanding an untensioned spring collar and frictionally retaining the same thereon whereby it may be applied to assembled relation on a connecting hub while in such expanded condition. To this end, an arrengement is provided whereby the mandrel or expanding pilot is slidably received in a housing or tool body which serves also as a follower or ejecting means for forcing the spring collar in its expanded condition onto the connecting hub to which it is applied.

It is therefore a primary object of this invention to provide a tool for use with spring collar retaining devices of the type specified and so constructed and arranged as to permit the application of the spring collar to clamping engagement with a connecting hub in a comparatively simple procedure requiring only a minimum of time, effort and assembling operations.

Another principal object of the invention contemplates the provision of such a tool comprising a pilot or mandrel designed for expanding and frictionally holding the spring collar assembled thereon, together with a relatively movable follower adapted to project the spring collar from the pilot, while in its expanded condition, onto and embracing the connecting hub in fitted, clamping engagement therewith.

A still further object is to provide such a tool construction comprising a plunger slidably mounted in a hollow tool body with one end thereof maintained in normal projecting relation to the tool body thereby presenting a substantial pilot onto which a spring collar may be quickly assembled preparatory to the application thereof to clamping engagement with a connecting hub by a simple direct axial thrust or reciprocation of the tool body.

Further objects and advantages of the invention will be apparent to those skilled in the art as a description thereof proceeds with reference to the accompanying drawing in which like reference characters designate like parts throughout the same, and in which:

Fig. 1 is a vertical section through a completed tool showing the tool body with the plunger slidably mounted therein together with the mechanism for maintaining an end thereof in normal projecting relation to the body in presenting a substantial pilot element;

Fig. 2 is a section taken along line 2—2 of Fig. 1 looking in the direction of the arrows;

Fig. 3 is a perspective, partly in section, showing a spring collar as applied to the connecting hub in a knob, handle or like part by the improved tool of the instant invention;

Fig. 4 is a vertical section of a portion of the tool showing the pilot element thereof about to be applied to a retaining collar;

Fig. 5 is a similar view showing the spring collar as expanded and retained in frictional engagement on the pilot element of the tool;

Fig. 6 to 8 inclusive show the several steps by which the tool is actuated to project the spring collar to clamping engagement embracing a connecting hub member on a part, Fig. 6 showing the initial step wherein the pilot with the spring collar frictionally held thereon is positioned in proximity to the connecting hub;

Fig. 7 shows the next step whereby the spring retaining collar is projected onto the connecting hub in its expanded condition, the body of the tool serving as a follower for this operation;

Fig. 8 shows the final step in which the tool is removed after the spring collar is disposed in clamping relation with the connecting hub;

Fig. 9 is a perspective partly in section showing the assembly of a control shaft and knob having a connecting hub and a retaining collar fitted thereto; and Fig. 10 is a side view, partly in section, illustrating such connecting means as embodied in a panel knob for an instrument control shaft.

Referring to the drawing, Figs. 1 and 2 show a preferred embodiment of the improved assembling tool of the instant invention designed for applying a spring retaining collar to assembled relation on a connecting hub provided on a part such as, for example, an instrument control knob illustrated in Fig. 3. It will be appreciated that the tool construction shown in Fig. 1 may be employed either as a hand setting implement or arranged in multiple in the manner of tool heads in the turret of a machine designed for automatically applying the spring rings to connecting hubs provided on parts of the type referred to in the quantity production of such parts. In the present example, a knob or like part designated generally 10, Figs. 3, 9 and 10 is molded of plastic material in a one piece device of suitable size and shape. Preferably, the knob is substantially annular in outward appearance and cup-shaped in section to provide an imperforate body 11 and, if desired, a peripheral flange 12 on which may be inscribed dial graduations, pointers, symbols and similar indicating means in a well known manner. Integrally formed within the knob in the molding operation is a hub 13 serving as a means for connecting the knob to the control shaft or rod 20, Figs. 9 and 10, it being quite obvious that this hub may assume any suitable form or shape and may, if desired, comprise the center area of a plastic part molded solid throughout. The said hub is usually slotted as at 14 to provide opposed, cooperating and relatively yieldable hub sections 15, 16, the slot being provided for preferably in the molding operation or in any other suitable manner thereafter as by sawing. One of the complementary hub sections 15 may be provided with a longitudinally extending, substantially semi-circular recess 17 which together with the opposed flat face of the cooperating hub section 16 presents a substantial D-shaped socket opening. The D-shaped socket opening thus provided in the hub, is admirably suited for rigidly and detachably receiving an end of a control shaft 20, Fig. 9, which is cutaway at one end to provide a stem 21 having a D-shaped cross-section corresponding substantially to that of the socket and comprises a flat face 22, and a tapered extremity facilitating ready application of the stem into the socket opening. It will be recalled that the material of the knob is often semi-plastic and subject to "cold-flowing" wherefore the plastic material of the side-walls of the socket opening tends to collapse and spread upon the application of force in a turning movement of the shaft which in heretofore known connecting means has resulted in faulty, loose connections in which there is objectionable side play and wobble. In order to guard against any such "cold-flowing" of the semi-plastic material, an inexpensive retaining means comprising a spring collar, presently to be described, may be employed most effectively in a manner to embrace the cooperating hub sections 15, 16 to supply a compressive force thereto and thereby continually urge the side-walls of the socket opening into firm, snug, rigid engagement with the stem of the shaft and otherwise reinforce the plastic material of said sections against any tendency toward "cold flowing" which would result in looseness and side play in the connection.

The retaining means for holding the stem in assembled relation between the cooperating hub sections comprises preferably a simple, inexpensive spring collar device 30 designed for embracing the hub sections 15, 16 in substantial clamping relation therewith. As shown, the spring collar is annular in form to snugly embrace the semi-cylindrical hub sections and is also split as at 31, Fig. 4, to provide for ready expansion thereof in the initial assembling operation. It is quite obvious however, that the spring collar may be of any suitable section to correspond to the combined area of cooperating hub sections in whatever form they may be. The spring collar is preferably constructed of spring steel for maximum resiliency and in its normal condition, has a cross-section somewhat less than that of the connecting hub to which it is applied. It may therefore be understood that due to the small size of the spring collars and the extreme resistance thereof against ready expansion by reason of their spring steel construction, it is a tedious, time-consuming procedure to apply the same by hand and virtually impossible to do so in close quarters as, for example, in a knob construction such as illustrated, wherein the connecting hub is completely concealed within the knob and is practically inaccessible except by a special tool device. The improved tool construction of the present invention is admirably suited for any such purpose of applying a spring retaining collar to a connecting hub and, by reason of its simple, compact construction is readily adapted for use in close quarters and otherwise inaccessible fastening constructions.

As shown in Fig. 1, the tool comprises a body portion 41 having a bore 42 extending longitudinally therethrough, the bore being surrounded by an annular wall 43 presenting a pronounced shoulder 44 at the leading end thereof, for a purpose presently to be described.

A plunger or mandrel 50 is slidably mounted in the bore 42 of the body and includes an extension or pilot 51 having a cross-section slightly greater than that of the connecting hub to which the spring collar is to be applied. The pilot extends beyond the shoulder 44 of the body in its normal projecting relation and is tapered at its extremity to facilitate introduction thereof into the spring collar, Fig. 4, for causing the same to expand and be frictionally retained thereon as shown in Fig. 5.

The pilot 51 is maintained in such normal projecting relation to the tool body 41 by a coil spring 60 engaging the end wall of the bore 42 at one end, and bearing against the head 52 of the plunger at the opposite end thereof. In order to limit the outward movement of the plunger under the action of the spring 60 and otherwise maintain the pilot 51 in normal projecting relation to the shoulder 44 of the tool body, a guide pin 45 is riveted or otherwise suitably mounted as by a press fit in opposed apertures 46 provided in the tool body. This guide pin is received in a longitudinally extending slot 53 provided in the plunger intermediate the ends thereof and accordingly, the end walls 54, 55 of the slot present end stops adapted to contact the guide pin 46 in the sliding movement of the plunger in the tool body. Thus, the end wall 54 in contacting the guide pin, limits the outward movement of the plunger under the action of the spring 60 and thereby maintains the pilot element 51 in its normal projecting relation to the tool body yet permits of ready sliding movement of the plunger therein when the tool is actuated in the application of a spring collar onto a connecting hub.

From the foregoing, it will be appreciated that in the method of applying a spring retaining collar to a connecting hub employing the tool of the instant invention, the spring collar is first assembled onto the pilot 51 of the tool head substantially in the manner represented in Fig. 4 wherein the tapered extremity of the pilot is inserted into the spring collar and moved axially therein to the position shown in Fig. 5 such that the spring collar is expanded to a size slightly greater than the connecting hub to which it is to be applied and is also frictionally retained on the pilot member. During this operation it will be understood that the pressure of the spring 60 in the tool body is such as to maintain the pilot in its normal projecting relation thus permitting a spring collar to be readily positioned onto the pilot by expanding the same substantially in the manner described. Thus it is contemplated that the instant tool be employed in such relation in the turret of an assembling machine in a procedure whereby the spring collar may be automatically picked up by the tool and positioned in proximity to the connecting hub on a part to which it is to be applied. It is also quite obvious that in this relation the instant tool is especially adapted for use in applying spring collars to connecting hubs in installations not easily accessible and without danger of the same becoming removed from assembled relation with the pilot.

With a spring collar thus assembled onto the pilot element 51, the tool is positioned in proximity to the connecting hub on a part to which it is to be applied, substantially as shown in Fig. 6, in which a hardened, semi-plastic member such as the panel knob 10 is represented. The plastic part, of course, is suitably supported whereupon the spring collar is easily and quickly advanced onto the connecting hub by a simple substantially direct axial reciprocation of the tool body as indicated in Fig. 7. During this action, it will be understood that the pressure of the coil spring 60 in the tool body is overcome to the extent that the plunger slides axially with respect to the tool body thus permitting the pilot 51 thereof to become fully received therein such that the pronounced shoulder 44 at the extremity of the tool body is effective to contact the adjacent peripheral edge of the spring collar to project the same axially onto the connecting hub. Inasmuch as the spring collar 30 on being applied to the pilot 51 is expanded to a size slightly greater than the cross-section of the connecting hub, it is thereby readily fitted thereto by the aforesaid reciprocating action of the tool body. And thus immediately after such reciprocation of the tool and the withdrawal thereof as illustrated in Fig. 8, the spring collar is no longer maintained in its expanded condition by the pilot 51 and is free to assume its normal, untensioned condition whereby the spring tension necessarily stored therein is effective to cause the same to embrace the connecting hub or hub sections under continuously effective spring clamping action. Naturally, when the tool is withdrawn from the completed assembly, the coil spring 60 is free to expand and through contact with the head 52 of the plunger urges the same outwardly relative to the tool body 41 to dispose the pilot 51 thereof in its normal projecting relation. This outward movement of the plunger is limited, of course, by the end wall 54 of recess 53 therein contacting the guide pin 45, in which relation another spring collar may be quickly assembled onto the pilot and the tool employed for advancing the same to tensioned clamping engagement with a connecting hub in a repetition of the foregoing procedure.

As shown in Figs. 9 and 10, a completed connecting means of the type described above, may be readily assembled with a cooperating shaft, rod, spindle or the like 20 having a reduced stem 21 received within the D-shaped socket opening presented by the hub sections 15, 16. Thus, the spring collar in its applied position embracing the connecting hub, serves to exert a continuously effective compressive force to the semi-plastic material of the hub and thereby urge the side walls of the socket opening thereof into firm, snug, rigid, engagement with the stem of the shaft at all times. In this way, even though the material of the knob is semi-plastic and naturally subject to "cold flow", the connection at all times is rigid and positive, and any tendency thereof to become loose is minimized to the extent that side play and wobble of the knob in assembled relation on the shaft is practically impossible. In one most important use, such connecting means are embodied in a panel knob employed with an instrument control shaft as illustrated in Fig. 10. In this relation, the spring collar connecting means permits ready removal and replacement of the knob without damage when it is necessary that the control shaft and the mechanism operated thereby be disassociated from the panel A of a cabinet structure for any necessary repairs or substitution of parts.

And while the tool of this invention has been described in detail with a specific example, such example is illustrative only since it will be apparent to those skilled in the art that other modifications within the spirit and scope of the invention may be constructed without departing from the teachings or essential characteristics thereof. The present embodiment is thereofore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed is:

A tool for applying a spring collar device to assembled relation on a connecting hub, stud, or the like, said tool comprising a body member provided with a bore and a shoulder at its leading end, a plunger slidable in said bore and means for retaining the plunger in assembled relation with said body member, a pilot on said plunger and means to maintain said pilot normally in projecting relation to said shoulder on the body member, said pilot having a substantially uninterrupted surface merging into a gradually tapered extremity to facilitate the application of a spring collar thereon, said pilot being of such size as to expand the spring collar to a size greater than the connecting hub and frictionally retain said spring collar thereon preparatory to the application thereof to the connecting hub, and said shoulder on the body member being adapted to engage and project the spring collar to assembled relation with the connecting hub upon actuation of the tool.

ALBERT H. TINNERMAN.